Jan. 28, 1969  C. THUMIM ET AL  3,424,044
CONTINUOUS THREE-KNIFE TRIMMER
Filed March 10, 1966  Sheet 1 of 9
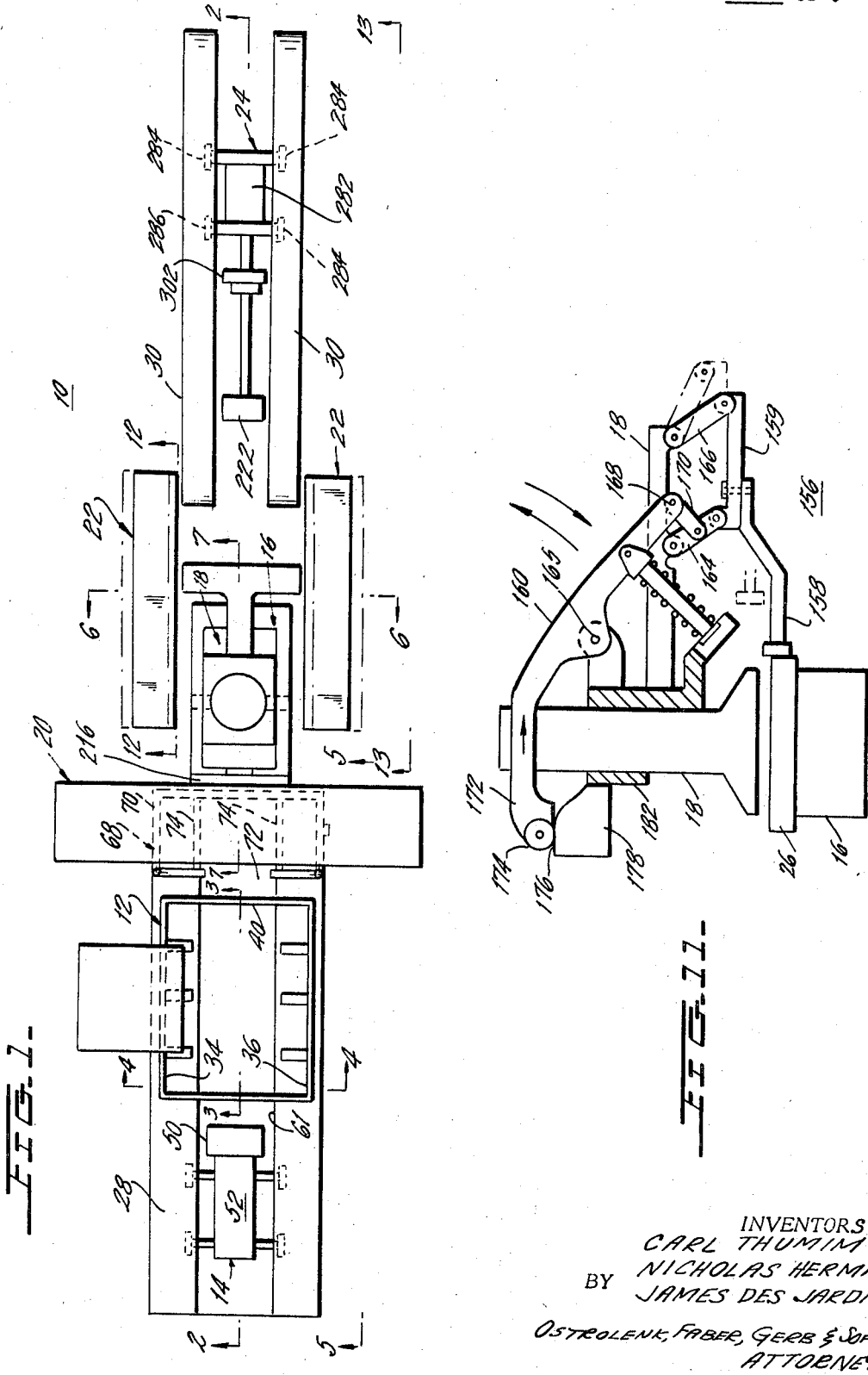
INVENTORS
CARL THUMIM
NICHOLAS HERMAN
JAMES DES JARDINS
BY
OSTROLENK, FABER, GERB & SOFFEN
ATTORNEYS

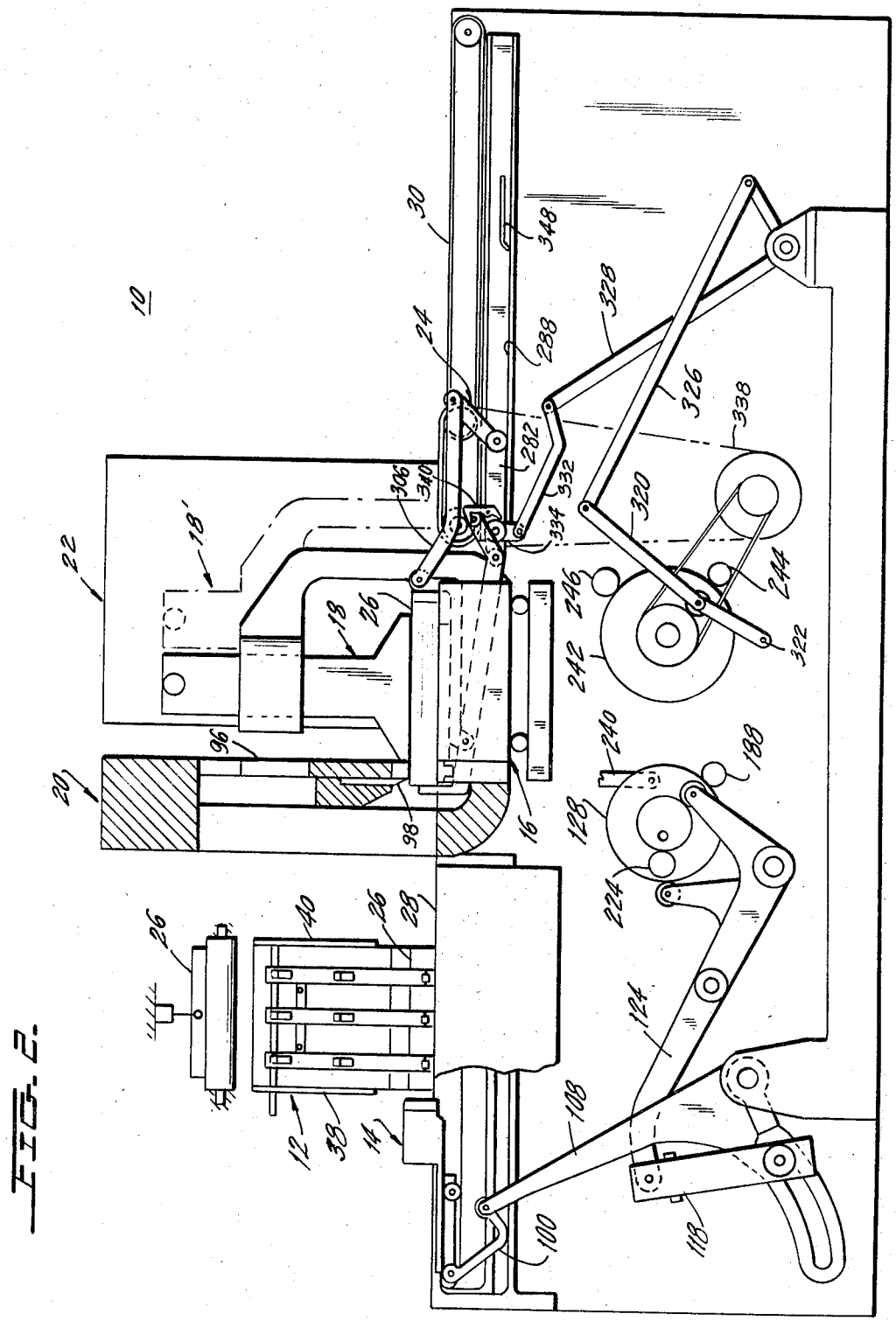

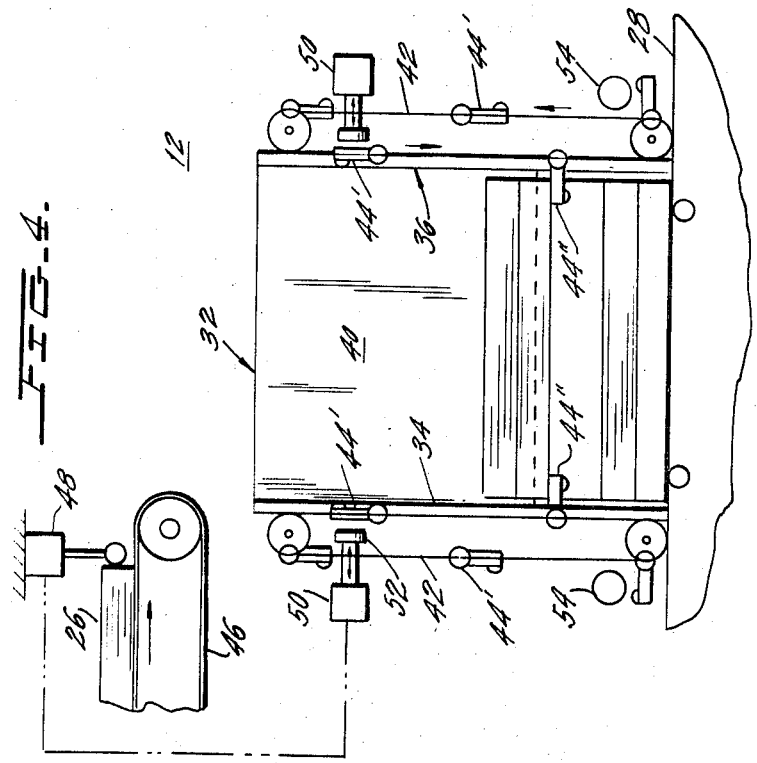
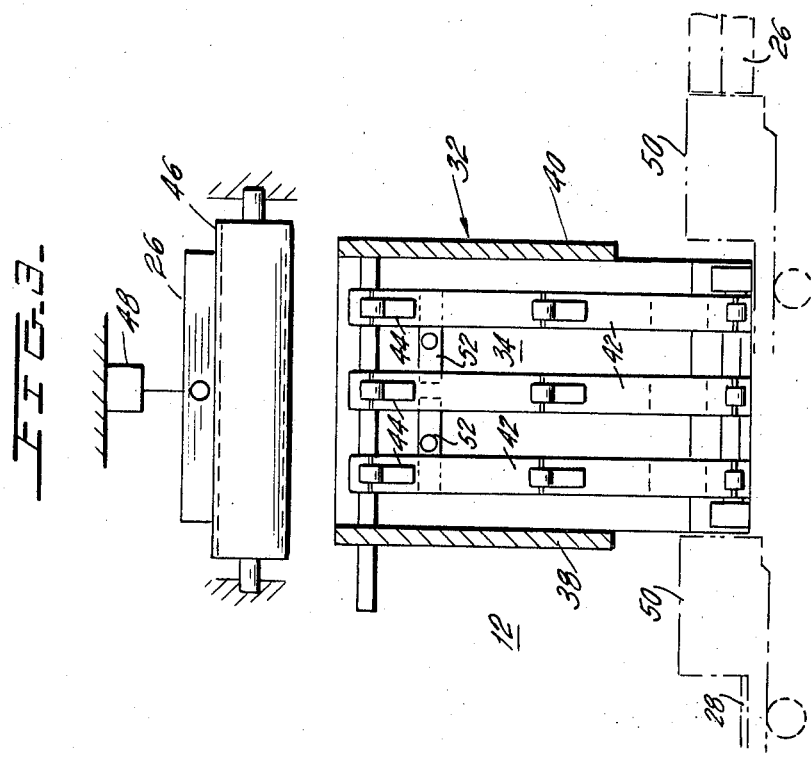

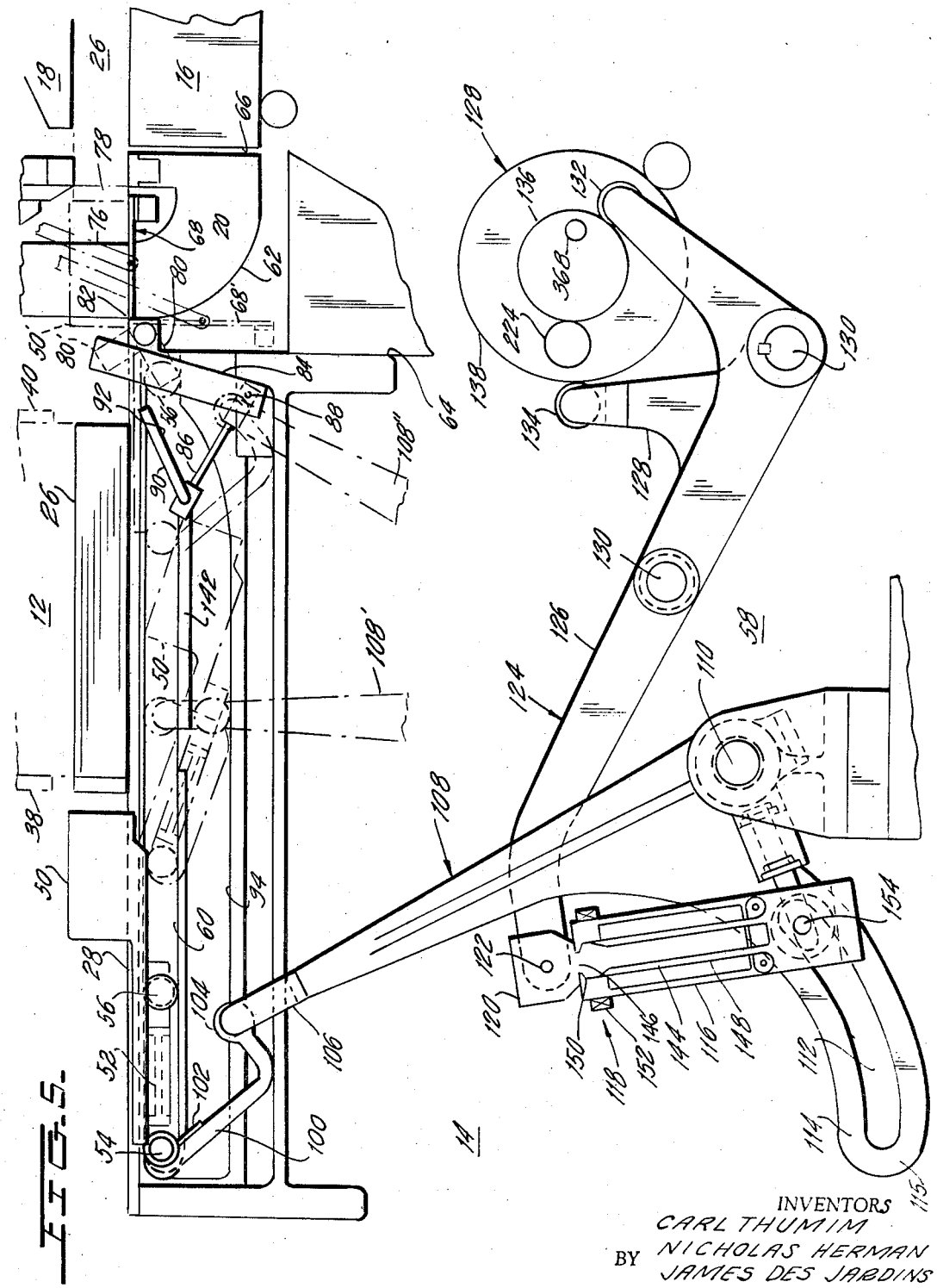

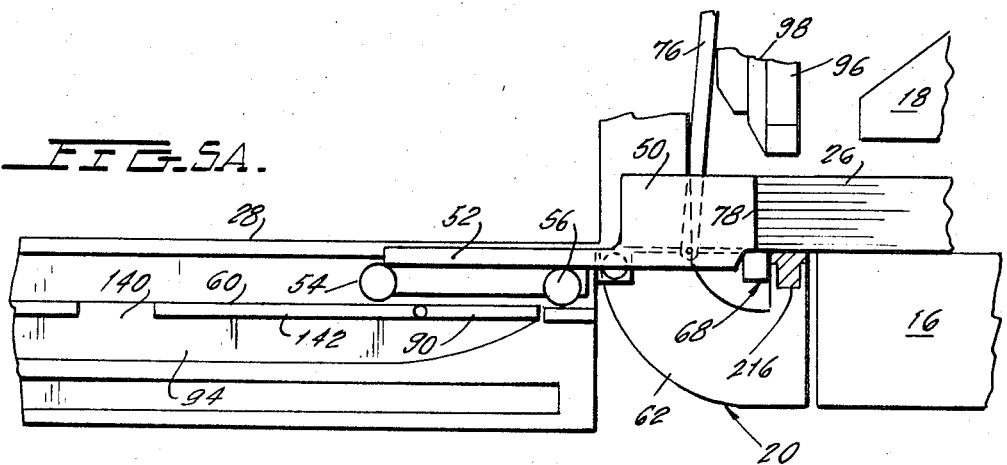
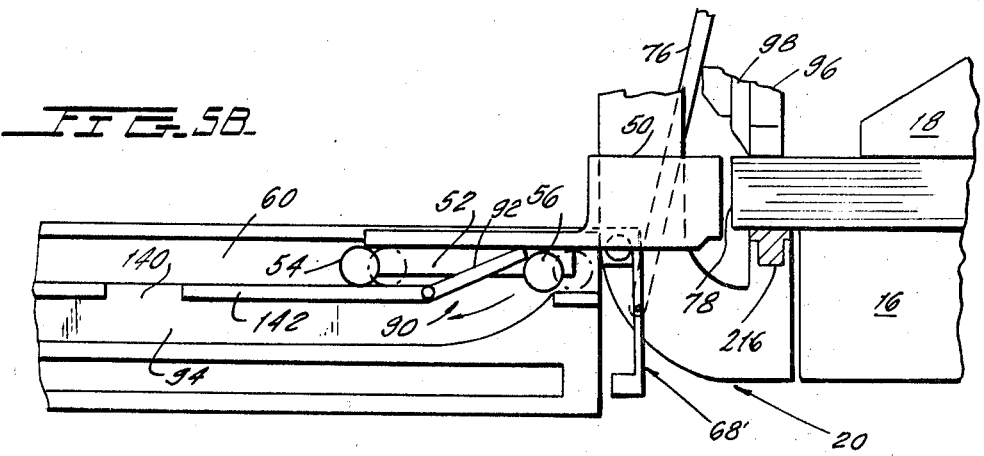
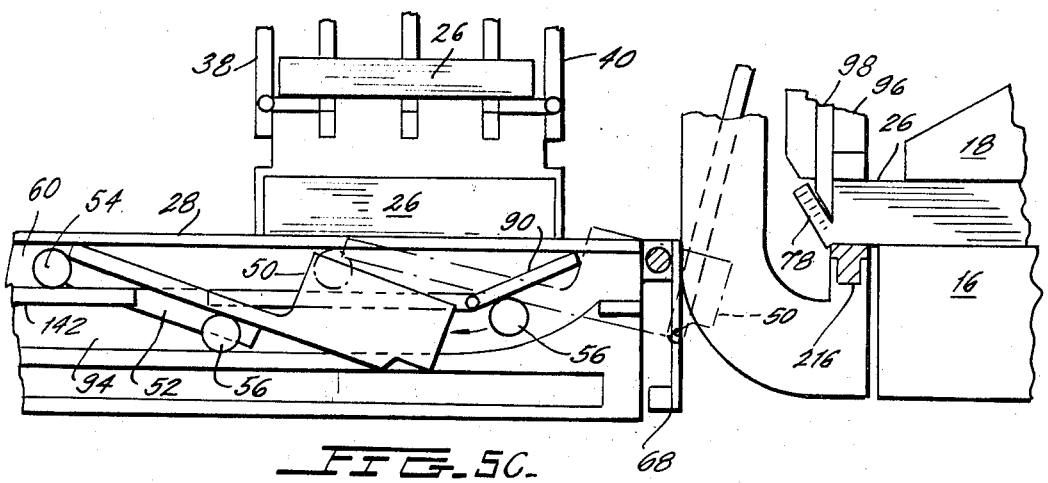

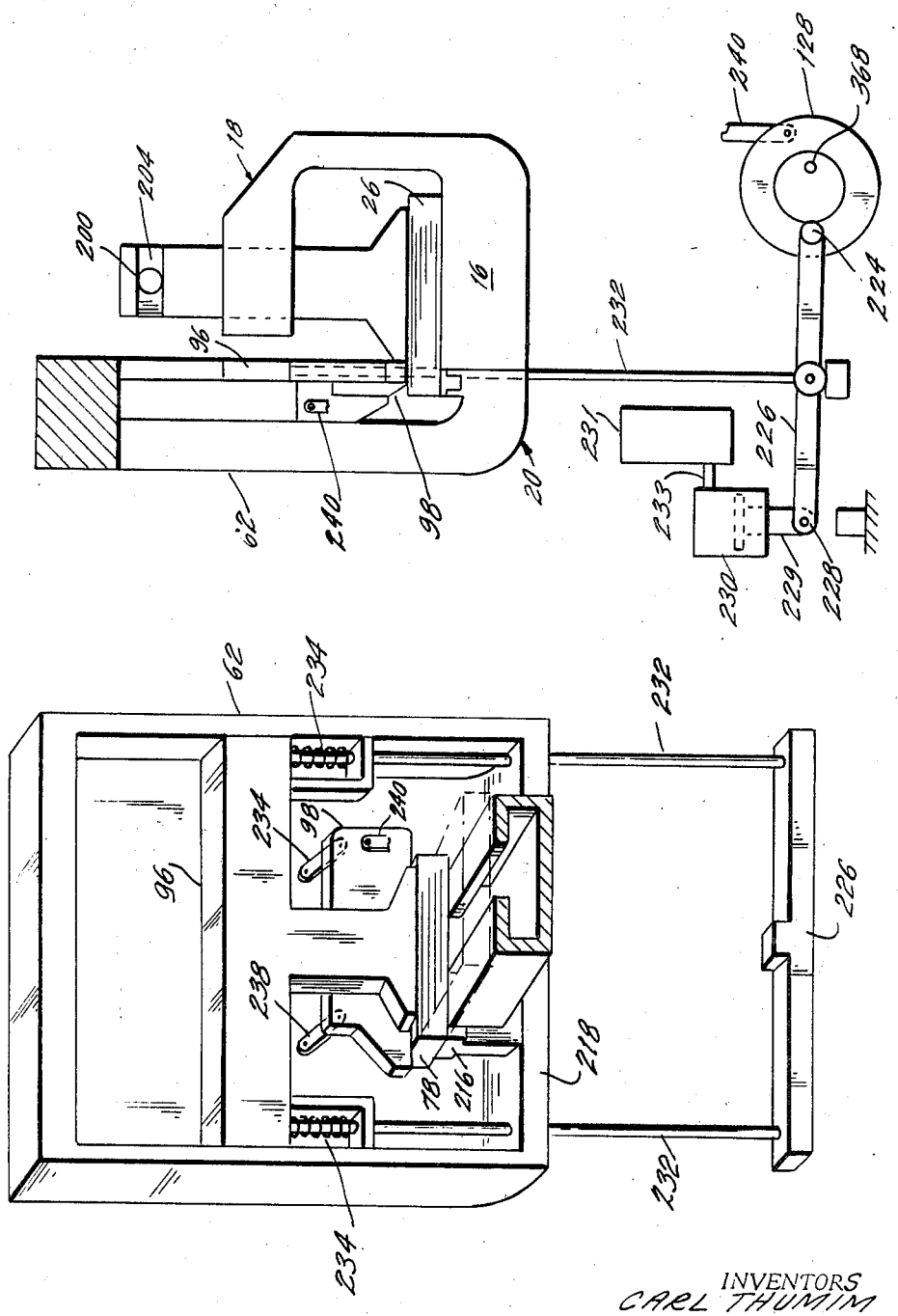

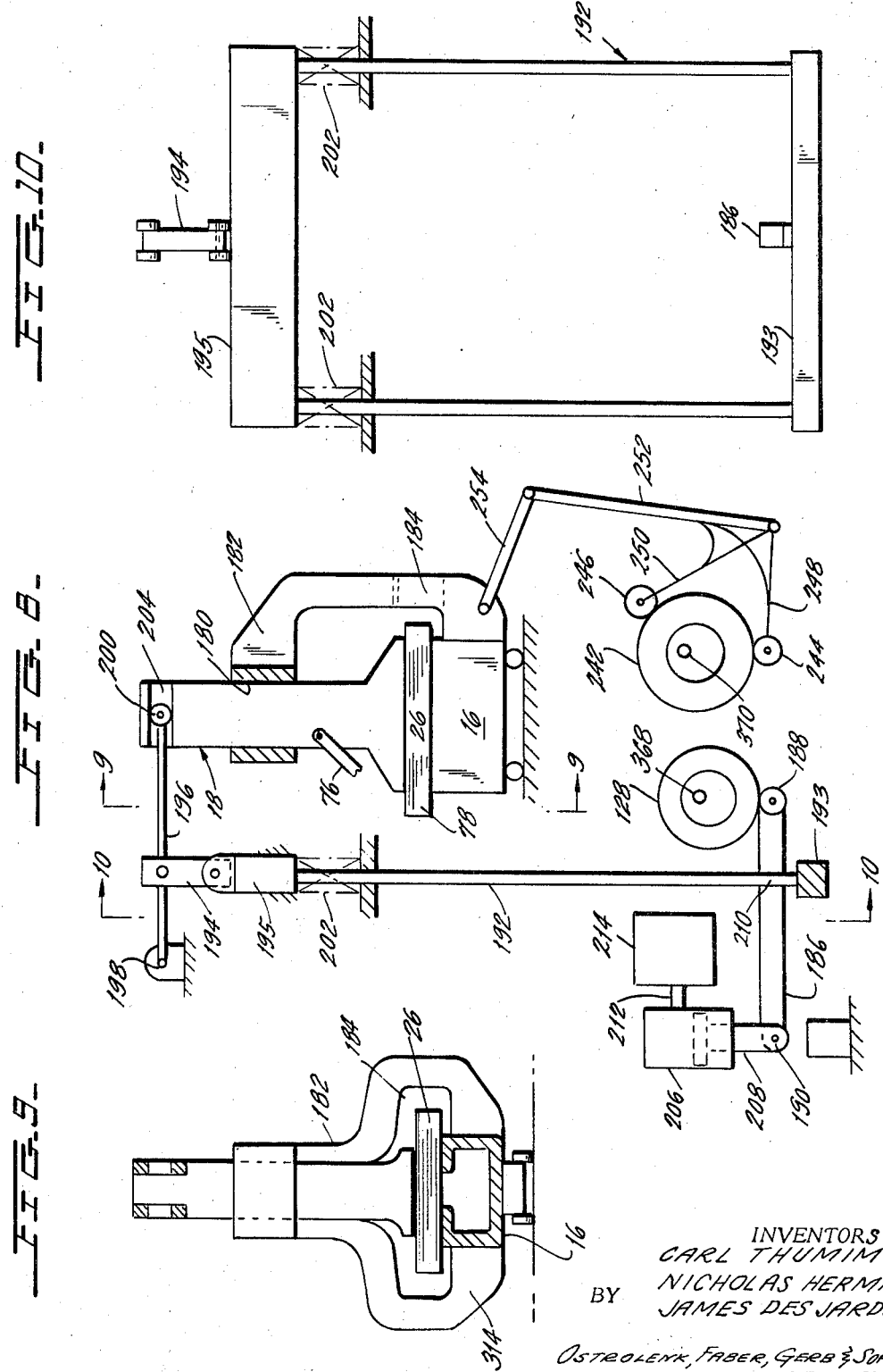

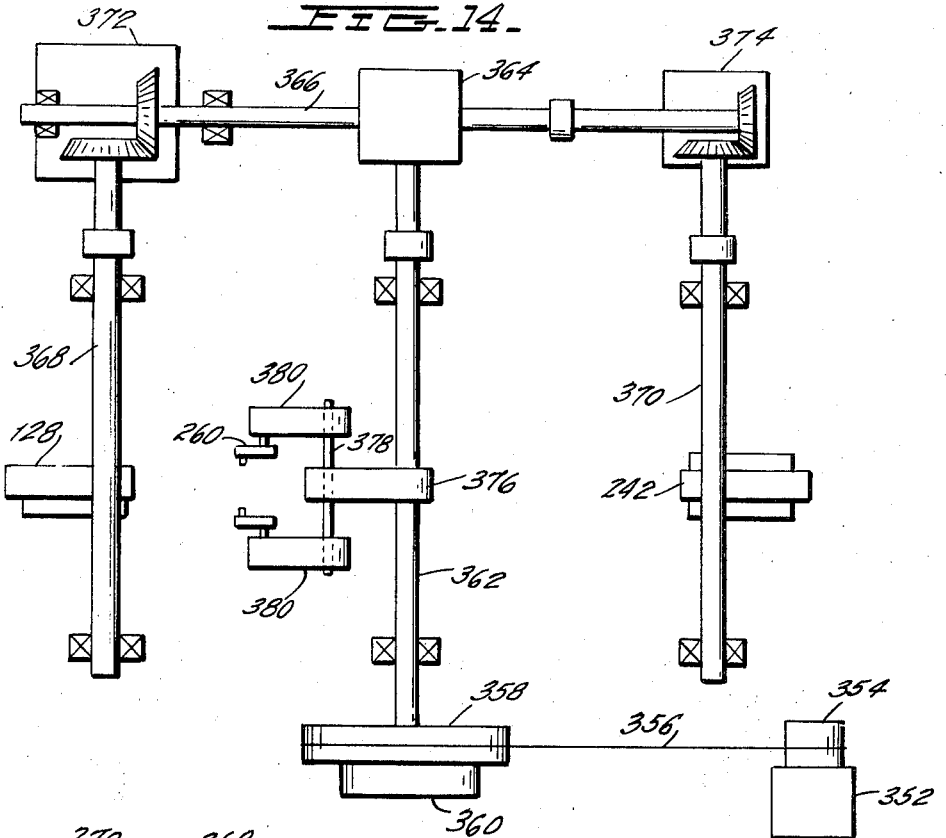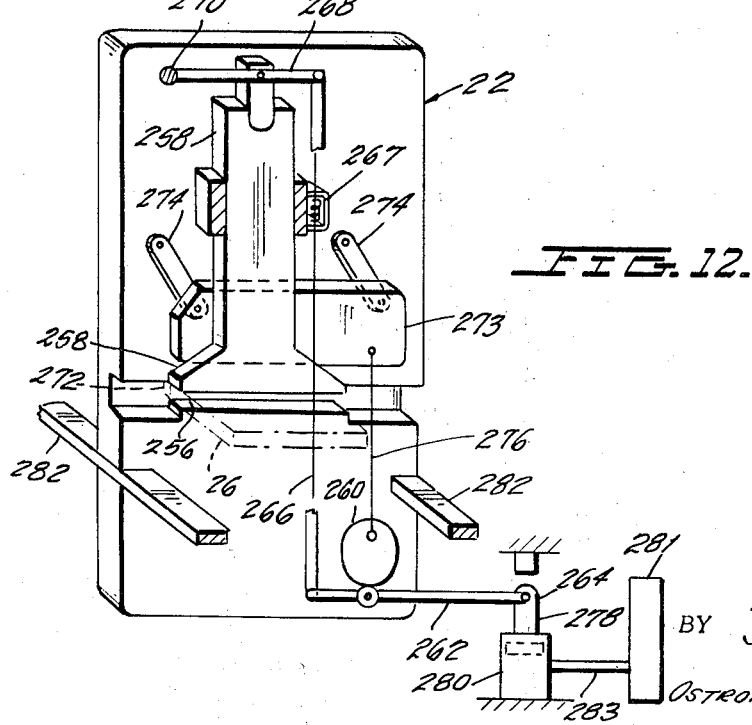

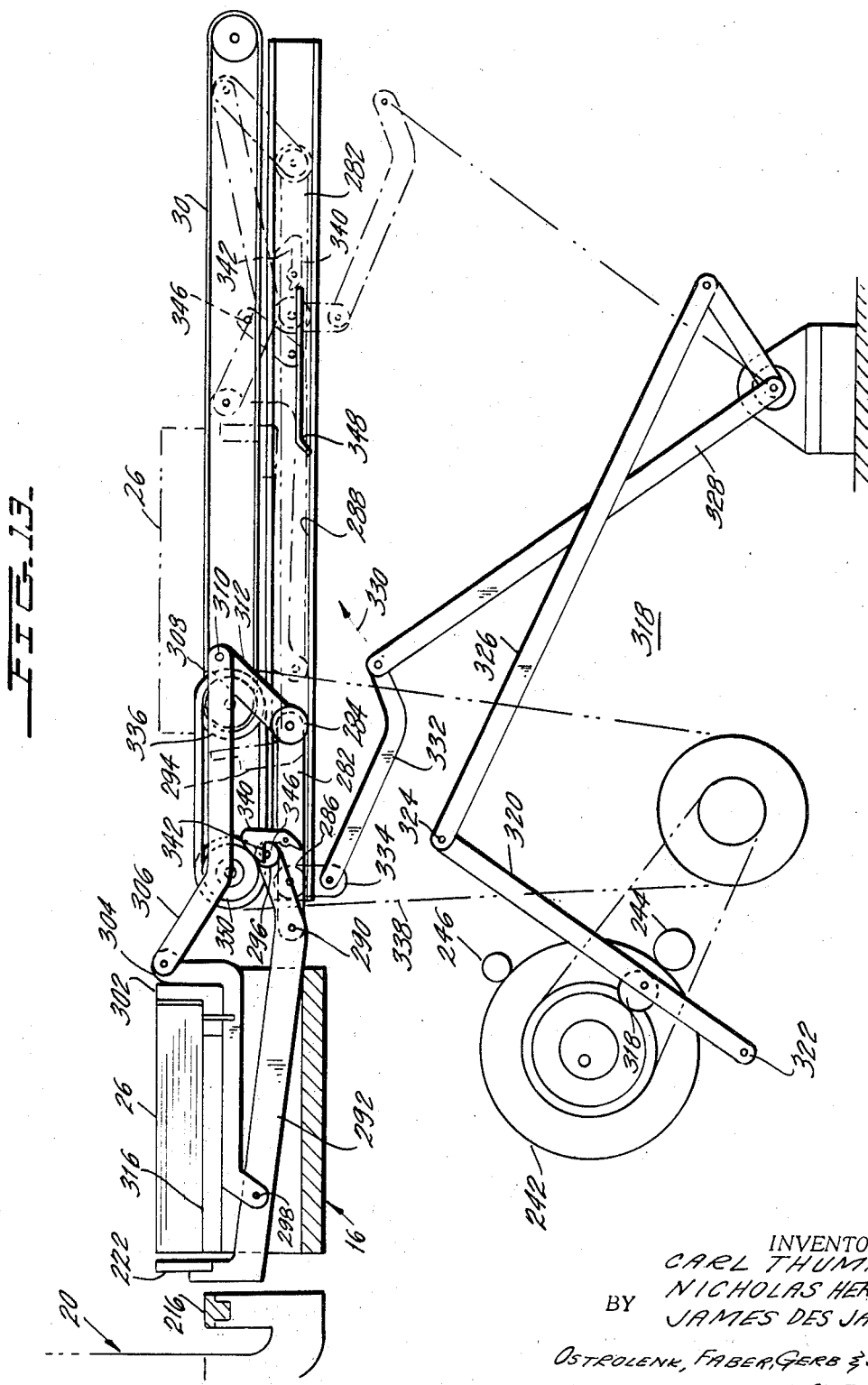

3,424,044
CONTINUOUS THREE-KNIFE TRIMMER
Carl Thumim, Chicago, Nicholas Herman, Palatine, and
James Des Jardins, Chicago, Ill., assignors to Miehle-Goss-Dexter, Incorporated, Chicago, Ill., a corporation of Delaware
Filed Mar. 10, 1966, Ser. No. 533,328
U.S. Cl. 83—255                                      23 Claims
Int. Cl. B26d 5/20, 7/20; B23d 31/00

This invention relates to cutting apparatus and more particularly relates to a continuous three-knife trimmer which is capable of accurately trimming three edges of a book or other similarly stacked paper material at an extremely high rate of speed.

The paper cutting and trimming industry has long felt the need for a continuous high-speed trimmer capable of accurately trimming three edges of a book, magazine or other similarly stacked paper material such that the output from such machine or trimmer requires no further trimming and can be forwarded to the final steps of manufacture which might include gluing, binding, etc. The instant invention provides such a high-speed continuous three-knife trimmer which is fully automatic, highly accurate, and capable of trimming three sides of a book, stack of books, or paper at rates as high as or better than 100 units per minute.

Basically the instant invention may be said to include eight subassemblies classified as follows: (1) stacking mechanism for depositing a predetermined quantity of material at the input side of the machine; (2) input feed mechanism for delivering the quantity of material deposited by the stacking mechanism onto a movable table located in the cutting area of the machine; (3) stop mechanism for accurately positioning the material on the table; (4) a transportable clamp mechanism for securely clamping the deposited material onto the table; (5) a front knife assembly for trimming a trailing edge of the material clamped on the table by the transportable clamp mechanism; (6) table operating mechanism for moving the table between its first position in which the material is originally stacked thereon, and a second position a predetermined distance to the rear of the machine whereby side knife assemblies may cut the sides of the material without interfering with the front knife assembly; (7) side knife assemblies for trimming the sides of the material once the table has moved to its second position; and (8) delivery mechanism for withdrawing the material from the cutting area of the machine to the output thereof whereby the material is now completely trimmed and ready to be passed on to the next step of manufacture.

As will be further explained throughout the specification, it is a feature of the instant invention that all eight subassemblies are coordinated and synchronized at a predetermined rate of speed, hereinafter termed cycle speed, such that all subassemblies will perform their designated operation at virtually the exact instant the material is properly positioned to be operated thereon. Thus a high-speed assembly line operation is achieved whereby material is continually fed into the machine at one end and continually fed out of the machine in its trimmed condition at the other end thereof with no wasted time lags in-between.

In order to understand the continuous assembly line type of operation referred to above, it is necessary to outline briefly the operation of each of the eight subassemblies; for only in understanding the interrelation and cooperation therebetween can one appreciate how the instant invention has been able to fulfill the long felt need for a high-speed three-knife trimmer.

The stacking mechanism includes a containing enclosure having a pair of oppositely disposed walls each of which comprises at least one closed loop endless belt upon which comprises at least one closed loop endless belt upon which are pivotally mounted a plurality of material supporting projecting fingers. Such fingers are automatically movable from a non-supporting, to a material supporting position after a predetermined quantity of material has been stacked on the fingers therebelow. Thus, for example, after a predetermined number of books have been stacked on one pair of the projecting fingers, a second pair of fingers is automatically extended to its supporting position whereby the next batch of exactly counted books or material may be accumulated. As the endless belts are rotated, the pairs of projecting fingers consecutively pass under and deposit the measured quantity of material on a work surface whereby they may be then fed into the cutting area of the machine by the input feed mechanism, to be described below.

As one further comment directed to the stacking mechanism, it is noted that the containing enclosure includes a second pair of walls oriented transversely to the walls defined by the endless belts. The bottom of such transversely oriented walls are spaced from the work surface upon which the material is deposited such that a pusher or transport means of the input feed mechanism may pass through the containing enclosure to feed the material deposited on the work surface into the cutting area of the machine.

The input feed mechanism includes the above noted pusher or transport means which travels above the work surface and through the containing enclosure of the stacking mechanism to feed the predetermined quantity of material to a second position on the aforementioned movable worktable which, at present, is occupying its first position.

As soon as the pusher or transport means is through the containing enclosure of the stacking mechanism and as it continues its path of travel to feed the material onto the worktable, the cycle speed chosen for the entire apparatus and at which speed the endless belts of the stacking mechanism are operating, assures that the next quantity of material is immediately deposited upon the work surface.

In order to prevent interference between the transport means or pusher and the subsequently deposited quantity of material, the input feed mechanism is provided with automatic guide means by which the pusher is returned to its original or starting position in a path of movement which is beneath the work surface. Thus the stacking mechanism can deposit the next quantity of material to be cut on the work surface without waiting for the pusher to return to its original or starting position, and thus the above described cooperation between the stacking mechanism and input feed mechanism eliminates one possible delay in the overall operation of the machine and thereby increases the rate of operating speed thereof.

As a further feature of the input feed mechanism, the operating mechanism therefor includes releaseable latching means normally rigidly connected between the driving source of power therefor and the transport means which pushes the material or book into the cutting area of the machine. If, by chance, a book or books should become jammed, the latching mechanism releases to provide a slip feature to relieve the pressure of the driving mechanism on the pusher and thereby prevent damage to the input feed mechanism.

Continuing the cycle of operation, the pusher or transport means feeds the book through the aforementioned front knife assembly and into the movable worktable, which at this instant occupies its first position which is spaced from the edge of the work surface upon which the book was originally deposited by a distance corresponding to the thickness of the front knife assembly.

In order to feed the book through the front knife assembly and yet still permit such assembly to perform its function of cutting the trailing edge of the book deposited on the worktable, there is provided on the edge of the work surface which abuts the front knife assembly, a pivoting bridge capable of occupying two positions. The first position is an up position in which the bridge extends through the front knife assembly and bridges the gap between the edge of the work surface and the movable table. Thus, as the pusher feeds the book onto the table book is prevented from falling through the space between the work table and work surface.

Once the book has reached its final position on the worktable, as determined by the stop mechanism, and the aforementioned transport clamp and front knife assembly begin to operate, the bridge is pivoted to a down position out of the way of the front knife assembly so that such front knife assembly may noninterferingly cut the trailing edge of the book now clamped in place on the table by the transportable clamp.

As the bridge is pivoted to its down position the pusher of the input feed mechanism has reached its furthest point of travel and the downwardly pivoting bridge actuates the aforementioned guide means to establish the return path of movement for the pusher, which as noted before is beneath the work surface upon which the next book is being deposited by the stacking mechanism.

The stop mechanism utilized for accurately positioning the incoming book comprises a longitudinally adjustabl upstanding stop which is movable between a down position, which hangs just above the surface of the movable table to stop and thereby position the incoming book, and an up position out of the way of the movable table such that the table may noninterferingly move to its second position. Since the transportable clamp means noted above firmly clamps the book to the movable table, and since, as will be described, such clamp moves with the table, it becomes apparent that the positioning stop is necessary only to position the book originally and may be moved to its second and up position as soon as the main transport clamp has moved from its top to its clamping position.

With the book now accurately located on the worktable in its first position, the main transport clamp followed by the front knife clamp of the front knife assembly may both start on their downward path of movement. As noted previously, as such events occur, the pivoting bridge is moved to its down position and at the same time the guide means of the input feed mechanism is automatically changed to provide that the return path of the pusher will be beneath the work surface upon which the next book is being deposited.

In order to compensate for the varied thicknesses of books or other material which the instant invention must be able to accommodate, the main transport clamp as well as the clamps of the front and side knife assemblies, which will be described in greater detail, are provided with pressure-relieving arrangements whereby cyclic operation of the respective driving mechanisms therefor will be able to continue and finish their cycle of operation even though the respective clamps thereof have already bottomed and clamped the book and respective edges thereof on the movable table. As will be further explained, the clamping systems utilized for the main transport clamp, and the clamps of the front and side knife assemblies, are pneumatic in nature and thus permit that the clamping pressure be adjustable at will as well as individually adjustable for each of the four clamps (main, front, and two side clamps) of the trimmer. Thus it is possible to supply a heavy pressure to the main transport clamp, so that the books will not slip while being transferred by the movable work table, while at the same time other pressures sutable for cutting may be supplied to the front and side knife clamps.

As the main transport clamp is bottoming on the book, and while the positioning stop and pivoting bridge are being rotated to their up and down positions, respectively, the front knife assembly functions to trim the trailing edge of the book in the following manner. First, the front knife clamp bottoms on the book leaving exposed only the trailing edge which is to be trimmed by the front knife blade. With the front knife clamp gripping the trailing edge of the book, the front knife blade is moved downwardly in a path of motion which is both vertical and lateral, thus assuring the proper shear angle, whereby the trailing edge of the book is trimmed.

As the front knife clamp and front knife blade are moved upward toward their original positions, the worktable and main transport clamp carried thereby are moved rearward to their second position during which time the side edges of the book are slid onto the lower stationary clamping surface of the two side knife assemblies. As the table comes to a halt, the side knife clamps of the side knife assembles bottom on the side edges of the book leaving exposed only those portions of the two side edges which are to be trimmed. Following almost immediately thereafter the side knife blades of the side knife assemblies are moved downwardly in a vertical and lateral direction to effectuate the proper shearing angle to cut the exposed edges of the book. It may be noted that the entire side knife assemblies may be adjusted laterally of the length of the machine in order to accommodate books of different width.

The final step required is to withdraw the book from the cutting area of the machine and onto a suitable surface such as a conveyor belt whereby the book may be transported to the next step in the manufacturing operation. To perform such function the instant invention includes a delivery apparatus which cooperates with the worktable and the bracket portion thereof which guidingly supports the main transport clamp.

The worktable is a generally hollow rectangular block which includes a slot along an upper surface thereof. The delivery mechanism includes a movable trolley having a pivoting carriage arrangement extending therefrom.

As the side knife assemblies are trimming the two side edges of the book, the trolley and carriage carried thereby are moved toward the table such that the carriage passes through the hollowed interior thereof. Cam means are provided such that when a forward paddle-carrying portion of the carriage has completely passed under the book and out of the front end of the table, the carriage rises such that the aforementioned paddle is now in front of the trailing edge of the book. Just as the side knife assemblies are finishing their cutting operation and the clamps and blades thereof as well as the main transport clamp are rising, rearward movement of the trolley and paddle-carrying carriage thereof withdraws the book from the table and transports it onto a conveyor belt which represents the final output of the machine.

It may be noted that the bracket portion of the work table which guidingly supports the transport clamp is provided with an enlarged opening through which the padde-carrying carriage and book may be passed in delivering the book from the table to the conveyor belt.

The instant that the main transport clamp, the side knife clamps, and the side knife blades begin to rise, the book is freed such that the paddle may move rearwardly to extract the book. Simultaneously, the table and transport clamp are moved in the opposite direction back to their first position after which time the adjustable stop may be lowered once again to position the next incoming book being guided over the now upwardly pivoted bridge by the pusher of the input feed mechanism. Thus the entire cycle is reinstituted in as short a period as possible to effectively increase the capacity of the machine.

In the brief outline presented above it can thus be seen that all of the subassemblies enumerated and outlined are cooperatively related to reduce the overall amount of time necessary to trim any one particular book, and further the cooperation and interrelationship thus established inherently permit the continual assembly-line type of operation which is an important aspect of the instant invention.

Accordingly, it is an object of the instant invention to provide a continuous three-knife trimmer which is comprised of a plurality of subassemblies which operate at cycle speed to effect high-speed assembly-line trimming of up to three edges of a book, magazine or other similarly stacked material.

It is another object of the instant invention to provide a three-knife trimmer which includes a work surface upon which a quantity of material which is to be moved to a second position may be deposited at a first position; transport means movable on said work surface from a starting position to a finishing position for moving such material from its first to its second position; transport driving means for moving said transport means between its starting and finishing position at a predetermined rate of speed; a material receiving table movable between a first position which is a predetermined distance from said work surface to establish a predetermined space therebetween and a second position which is further from the work surface than the first position of said work table, the first position of the table corresponding to the second position of the material; a front knife assembly positioned in said predetermined space for cutting a first edge of the material when the material is moved to its second position on said table in its first position by the transport means; a side knife assembly positioned a predetermined distance from the front knife assembly for cutting a second edge of the material which is transverse to the first edge when the table is moved to its second position; and table operating means for moving the table at said predetermined rate of speed from its first to its second position only after the front knife assembly has cut the first edge.

It is a further object of the instant invention to provide such a combination of elements which further includes stacking mechanism for automatically stacking said predetermined quantity of material on said work surface, wherein said stacking mechanism comprises a containing enclosure including at least one pair of oppositely disposed walls comprised of at least one closed loop endless belt having a plurality of projecting supporting fingers pivotally mounted thereon.

Still another object of the instant invention is to provide such a continuous three-knife trimmer which further includes delivery mechanism for extracting the quantity of material from the trimmer after its three edges have been trimmed thereby.

Yet another object of the instant invention is to provide such a continuous three-knife trimmer wherein the stacking mechanism work surface and input feed mechanism cooperate in such a manner as to permit a subsequent quantity of material to be deposited on the work surface before the pusher or transport means of the input feed mechanism returns to its starting position.

Still another object of the instant invention is to provide such a continuous three-knife trimmer wherein the input feed mechanism thereof includes releaseable latching means for disconnecting the operating source of power from the pushing transport means in the event of jamming of books in the machine.

Still another object of the instant invention is to provide a continuous three-knife trimmer which includes a generally hollow front knife assembly positioned between the work surface and a material-receiving movable table spaced therefrom, and wherein there is provided pivoting bridge means for bridging the gap between said work surface and worktable when the input feed mechanism is depositing the predetermined quantity of material through the front knife assembly and onto the worktable.

Yet another object of the instant invention is to provide such a continuous three-knife trimmer wherein said worktable with the predetermined quantity of material deposited thereon is movable between a first position in which a trailing edge of the material may be trimmed by the front knife assembly and a second position in which the side edges of the material transverse to the trailing edge of the material may be noninterferingly trimmed by side knife assemblies of the machine.

Still another object of the instant invention is to provide such a continuous three-knife trimmer which further includes transportable clamp means movable with the movable worktable for rigidly clamping the predetermined quantity of material on the worktable.

Still another object of the instant invention is to provide such a continuous three-knife trimmer which includes pivoting stop means movable between a blocking position for accurately locating the leading edge of the incoming quantity of material, and a noninterfering up position which permits movement of such table between its first and second position.

Still another object of the instant invention is to provide such a continuous three-knife trimmer wherein the various clamping mechanisms utilized therein each include pressure-relieving means which inherently permit the clamping arrangements to accommodate different thicknesses of material.

Still another object of the instant invention is to provide such a continuous three-knife trimmer wherein the various clamping mechanisms utilized therein are pneumatic in nature to permit the individual selection of pressure for a particular clamping purpose.

Still another object of the instant invention is to provide such a continuous three-knife trimmer which is interrelated through a geared driving mechanism driven by a single source of power so as to assure synchronized operation of the entire apparatus and thereby increase the capability thereof.

Other objects and a fuller understanding of the invention may be had by referring to the following description and drawings, in which:

FIGURE 1 is a plan view of the continuous three-knife trimmer of the instant invention;

FIGURE 2 is a side view, partially in section, taken along the arrows 2—2 of FIGURE 1;

FIGURE 3 is a sectional view of the stacking mechanism shown in FIGURE 1, taken along the arrows 3—3 thereof;

FIGURE 4 is a detailed view of the stacking mechanism of FIGURE 1 and taken along the arrows 4—4 thereof;

FIGURE 5 is a detailed view of the input feed mechanism of FIGURE 1 and taken along the arrows 5—5 thereof;

FIGURES 5a, 5b and 5c are detailed sequential operating views of the input feed mechanism of FIGURE 5;

FIGURE 6 is a perspective view of the front knife assembly and work table shown in FIGURE 1 and taken along the arrows 6—6 thereof;

FIGURE 7 is a sectional view taken along the arrows 7—7 of FIGURE 1;

FIGURE 8 is a somewhat schematic sectional side view of the table and transport clamp operating mechanism shown in FIGURES 1 and 2;

FIGURE 9 is an end view taken along the arrows 9—9 of FIGURE 8;

FIGURE 10 is a view taken along the arrows 10—10 of FIGURE 8;

FIGURE 11 is a somewhat schematic perspective view of the stop mechanism utilized in the instant invention;

FIGURE 12 is a perspective view of the side knife assembly shown in FIGURE 1 and taken along the arrows 12—12 thereof;

FIGURE 13 is a side view of the delivery apparatus shown in FIGURE 1 and taken along the arrows 13—13 thereof; and FIGURE 14 is a plan view of the driving mechanism utilized in the instant invention.

Referring to FIGURES 1 and 2, there is shown a continuous three-knife trimmer 10 constructed in accordance with the teachings of the instant invention. As has been previously noted, the three-knife trimmer 10 is capable of rapidly and accurately trimming up to three edges of a book, magazine or other similarly stacked paper material in a fully automatic, continuous operation. For ease of identification and nomenclature, throughout the remainder of this specification, the material to be trimmed by the instant invention be hereinafter referred to as a book, although it is to be understood that the instant invention is equally applicable to a stack of books, a magazine or stack of magazines, or any other similarly stacked quantity of paper material capable of being trimmed in guillotine fashion.

The trimmer of FIGURES 1 and 2 may be conveniently broken down into eight subassemblies, which were briefly outlined above. They include a stacking mechanism generally indicated at 12; an input feed mechanism 14; a movable worktable 16; a transportable clamp 18; stop mechanism 19 (not shown in FIGURES 1 and 2); a front knife assembly 20; two side knife assemblies 22; and a delivery mechanism generally indicated by the reference character 24. The operation of the three-knife trimmer 10 may be briefly summarized as follows:

A book 26 is initially fed into stacking mechanism 12 whereby it is deposited upon the slotted work surface 28 therebelow. Input feed mechanism 14 pushes the book 26 through the front knife assembly 20, against back stop 158 (see FIGURE 11), and onto the movable table 16 initially occupying the solid line position shown in FIGURE 2. Immediately thereafter movable transport clamp 18 is lowered to clamp the book 26 firmly on the table 16 while virtually simultaneously, although a bit delayed, front knife assembly 20 operates to trim the trailing edge of the bok to the required specification. After operation of the front knife assembly 20, back stop 158 is lifted and the movable table 16 and transport clamp 18 movable therewith are moved rearwardly to their second position indicated by the dotted outline 18' in FIGURE 2, whereby the edges transverse to the trailing edge of the book 26 are slid into and operatively positioned within the side knife assemblies 22. The side knife assemblies are operated to trim the side edges of the book and the cutting operation is now complete. As the final step, the movable transport clamp 18 releases the book 26 and the delivery mechanism 24 extracts the book from beneath the transport clamp 18 and onto a delivery table 30 which, in this instance, is a pair of moving conveyor belts.

To facilitate explanation of the instant invention, each of the book to the required specification. After operation and a detailed explanation provided for each of the main subassemblies 12, 14, 16, 18, 19, 20, 22 and 24.

STACKING MECHANISM

Referring most specifically to FIGURES 3 and 4, the stacking mechanism 12 is seen to comprise a containing enclosure 32 which includes two pairs of oppositely disposed walls 34, 36 and 38, 40, respectively. Walls 34 and 36 each comprise a plurality of a closed loop endless belt 42 upon which are pivotally mounted a plurality of projecting fingers 44. The fingers 44 are spring-biased, by means not shown, to occupy one of two positions illustrated as 44' and 44" in FIGURE 4, which represent nonsupporting and supporting positions, repectively.

In operation, books 26 are transported to a position above the enclosure 32 by means of conveyor belt 46. After passing by and registering their presence on any suitable counter 48, the books are dumped into the containing enclosure or hopper 32. After a predetermined number of books have been counted by the counter 48 and deposited on the extending fingers 44", a pair of electromagnets 50 are automatically operated such that their respective armatures 52 strike the next pair of fingers 44 so as to rotate them from their nonsupporting position 44' to their extended supporting position 44" whereby the next predetermined and counted quantity of books may be deposited thereon.

As the pairs of fingers 44" approach and pass beneath the work surface 28, the consecutively stacked quantities of books are deposited thereon. After each pair of fingers 44" comes up from beneath the surface 28, they engage the fixed rods 54 whereby they are once more returned to their nonextended, nonsupporting position 44' where they remain until struck by the armatures 52. It will be apparent that simple adjustment of the energizing counter 48 will control the quantity of material which is continuously deposited upon the work surface 28.

It may be noted that, although not shown, the walls 34 and 36 are movable relative to each other to vary the width of the containing enclosure or hopper 32 so that it may accommodate books of different widths.

As may be most clearly seen in FIGURES 2 and 3, the second pair of side walls 38, 40 do not extend all the way to the work surface 28. To the contrary, the bottom edges thereof are a predetermined distance above such work surface. Such space is provided to permit the pusher or transport means 50 of the input feed mechanism 14 to pass through the enclosure 32 to deliver the stacked books 26 through the front knife assembly 20 and onto the worktable 16. Although not specifically shown, walls 38, 40 may be adjustable relative to one another to vary the length of the enclosure 32.

INPUT FEED MECHANISM

Referring most specifically to FIGURE 5, there is shown a detailed view of the input feed mechanism 14 and the manner in which it cooperates with the stacking mechanism 12 schematically represented by the lower portion of the side walls 38, 40 thereof. The purpose of the input feed mechanism is to transport the book 26, which has been deposited on the work surface 28 by the stacking mechanism 12, from its first position immediately beneath the stacking mechanism 12, through the front knife assembly 20, against the back stop, to its second position on the movable table 16.

To accomplish such movement there is provided the pusher 50 which is secured to the trolley 52 mounted on rollers 54 and 56. As will be further explained, in response to activation of the input feed driving mechanism, generally indicated at 58, the trolley 52 and pusher 50 carried thereby is movable on rollers 54 and 56 from the initial starting position shown in solid line in FIGURE 5 to a finishing position indicated by the dotted pusher 50' in FIGURE 5 whereby the book 26 will have been moved from beneath the stacking mechanism 12, through the front knife assembly 20, and onto the movable worktable 16.

During its path of movement from its starting to finishing position thus defined, the trolley carrying rollers 54 and 56 are guided by an upper track or guide 60 such that although the trolley 52 and rollers 54, 56 are beneath the work surface 28, the pusher 50 extends up through the slot 61 (see FIGURE 1) in the work surface 28 to engage and push the book 26.

As noted previously and as most clearly seen in FIGURE 6, the front knife assembly includes a window frame 62 to permit the book 26 and pusher 50 to pass therethrough in depositing the book on the movable worktable 16.

In order to facilitate the passage of book 26 through the window frame 62 of the front knife assembly 20 and to prevent its falling in the space which would otherwise be present between the front edge 64 of the work surface 28 (see FIGURE 5) and the trailing edge 66 of the worktable 16, there is provided a bridge 68 pivotally secured to the front surface 64 of the work surface 28.

As most clearly seen in the plan view of FIGURE 1, the bridge 68 actually comprises a pivoting frame 70 provided with a break or opening 72 which permits the passage of pusher 50 therethrough. Frame 70 also includes a pair of straps or belts 74 upon which the book 26 will be guided in passing through the front knife assembly 20.

As will be most clearly explained with respect to the sequential sketches of FIGURES 5a, 5b and 5c, but as may also be seen in FIGURE 5, the bridge 68 is movable in response to movement of a link 76 between an up position shown in solid lines in FIGURE 5, in which position it bridges the space between the work surface 28 and the movable table 16, and a down position shown as dotted position 68' in FIGURE 5, whereby as will be further described, the front knife assembly 20 may noninterferingly perform the trimming operation on the trailing edge 78 of the book 26 once the main transport clamp 18 bottoms thereon.

As the bridge 68 is being rotated to its downward position, the lever arm 80 securely mounted on the rotating pivot pin 82 rotates to its dotted line position 80' of FIGURE 5 whereby the member 84 is raised such that the lever arm 86 pivotally pinned thereto at 88 is rotated to its solid line position in FIGURE 5, consequently rotating a switch arm 90 from a down position shown in FIGURE 5a to the solid line position shown in FIGURES 5, 5b and 5c.

As shown in FIGURE 5, when the main transport clamp 18 bottoms on the book 26 and causes the link 76 and members secured thereto to rotate the switch 90 to the up position shown in FIGURE 5, the trolley 52 has reached its rightmost point of travel in FIGURE 5 such that the front wheel 56 thereof abuts the front surface 64 of the work surface 28. Consequently as the trolley is returned to its starting position shown at the left hand side of FIGURE 5 under the influence of input feed driving mechanism 58, the front wheel 56 is guided by the under surface 92 into a second or lower track 94. Thus as the trolley 52 continues its rearward motion back toward its starting position, the pusher 50 is automatically lowered through the slot 61 of the work surface 28 to a position below that surface; and the trolley may be returned to its initial or starting position even while a second book 26 is being deposited above the returning trolley and pusher by the stacking mechanism 12. It becomes apparent therefore that the cooperation of the stacking mechanism and input feed mechanism inherently increases the capabilities of the instant invention by eliminating the timelag which would otherwise occur if the deposit of subsequent books had to wait for the pusher 50 to be returned through the containing enclosure 32 of the stacking mechanism 12.

Referring to FIGURES 5a, 5b and 5c, there is shown in schematic form the sequence of events described above. In FIGURE 5a the switch 90 is in its down position and the trolley 52 and pusher 50 have been moved under the influence of input driving mechanism 58, not shown, to its finishing or extreme right position whereby the book 26 has been deposited on the table 16 with the trailing edge 78 thereof positioned within the front knife assembly for trimming thereof. As will be explained, there is provided adjustable stop means, not shown in FIGURES 5a–5c, for accurately positioning the book 26 on the table 16. It should be noted that in FIGURE 5a the bridge 68 is in its up position and hence bridges the gap between the work surface 28 and the table 16 to permit the book to cross therebetween. At this point the main transport clamp 18 is in its up or releasing position.

In FIGURE 5b the main transport clamp 18 has been moved down to its clamping position, by mechanism to be further described, and in response to such movement the link 76 has rotated the bridge 68 to its own or noninterfering position while at the same time the movement of the bridge 68, through members 80, 84 and 86, has caused the switch 90 to be moved to its up position. FIGURE 5b shows the trolley 52 starting back toward its initial position whereby the front wheel 56 thereof is just engaging the under surface 92 of the switch 90. Immediately after the bottoming of main transport clamp 18, the front knife clamp 96 and front knife blade 98 of front knife assembly 20 begin their downward motion, in a manner to be further described.

FIGURE 5c shows the front knife blade 98 trimming the trailing surface 78 of the book 26, which, as noted before, is now made possible because the bridge 68 has been rotated to its down, noninterfering position. FIGURE 5c also shows the front wheel 56 of the trolley 52 being guided by the lower track 94 such that the pusher 50 is returned toward its initial position beneath the surface 28 whereby the next book 26 may be deposited on such surface even while the pusher 50 is returning to its initial position.

Returning once more to FIGURE 5, the operation of the input feed driving mechanism 58 will now be explained. Pivoted on the rear axle upon which rear wheel 54 of trolley 52 rotates is a generally L-shaped linking arm 100. For purposes which will be explained, there is provided a spring 102 biased to continually urge linking arm 100 away from trolley 52. Pivotally secured to arm 104 of linking arm 100 is the driving arm 106 of a bellcrank lever 108 which is mounted for pivotal rotation about fixed pivot point 110. Adjustably positionable within an arcuate slot 112 of the driven arm 114 of bellcrank lever 108 is one end of one member 116 of a releaseable latching means 118, a second member 120 of which is pinned on one end 122 of a bifurcated cam follower lever 124 which is rotatable in both the clockwise and counterclockwise rotation in response to rotation of a cam 128 mounted for rotation on an offset shaft 368. The two arms 126, 128 of cam follower 124, are joined by rods 368. Arms 126 and 128 include rollers 132 and 134, respectively, which are movable and guided by the inner and outer surfaces 136 and 138 of cam 128.

In operation, initial rotation of cam 128 by cam shaft 368 rotates cam follower 124 in the clockwise direction with respect to FIGURE 5 which thereby rotates bellcrank lever 108 in a clockwise direction by means of the normally rigid releasable latching means 118. Clockwise rotation of bellcrank lever 108 causes the driving arm 106 thereof to pass through the three positions 108, 108' and 108" of FIGURE 5 during which time the trolley 52 is moved from its initial to its finishing position by means of linking arm 100. It may be noted that as the bellcrank lever 108 is being rotated the linking arm 100 is urged against the bias of spring 102 toward the trolley 52.

When the trolley reaches its finishing position, the book has been deposited on the table 16, the main transport clamp 18 descends, and the bridge 68 and swtich 90 are moved to their down and up position, respectively, as previously described.

Continued rotation of cam 128 now causes the surface 138 thereof to urge roller 134, arm 128 and the cam follower 124 in a counterclockwise direction, which, through releaseable latching means 118, causes the bellcrank lever 108 to reverse its direction and pass from position 108" through 108' and back to its initial position indicated at 108.

It will be appreciated that when bellcrank lever 108 occupies the center position 108' of FIGURE 5, the L-shaped linking arm 100 has been urged toward trolley 52 against the bias of spring 102. The bias developed on spring 102 is utilized to return the front wheel 56 of trolley 52 to the upper track 60 in the following manner. As can be clearly seen in FIGURES 5, 5a–5c, there is provided an opening 140 in the intermediate surface 142 separating the upper and lower tracks 60 and 94. When the front wheel 56 of the trolley 52 reaches the opening 140 the bias developed on spring 102, which as noted before, tends to separate linking arm 100 and trolley 52, snaps the front wheel 56 back to the upper track 60 whereby it will be returned on the upper track to its initial position in FIGURE 5.

In order to prevent damage to the parts of the input feed mechanism thus far described, the releasable latching means is designed to separate and provide a slip-type of linkage which prevents rotation of bellcrank lever 108 in the event of jamming of books on the surface 28, even though the cam 128 may still be rotating. To this end the second member 120 thereof includes a tapered trunk portion 144 having a recess 146 thereabout. The trunk portion fits into an interior cavity 148 of the first member 116, with member 16 including a circumferentially arranged detent shoulder 150 which fits into the recess 146 on the tapered trunk 144 of member 120. A garter spring 152 surrounds member 116 and continually urges the detent shoulder 150 into the recess 146.

In the event that a book jams in the machine, but the cam 128 is still rotating, the force exerted by such jammed book against the pusher 50 is greater than the force developed by garter spring 152, and the tapered trunk portion 144 of the member 120 is pulled out of the cavity 148 of member 116 to prevent the application of the force developed by cam follower 128 on the bellcrank lever 108. If during the continued rotation of cam 128 and the consequent counterclockwise rotation of cam follower 124, the jamming has been relieved, the tapered trunk portion 144 will be automatically reinserted (it never comes completely out) into the cavity 148 with the garter spring 152 automatically biasing the shoulder 150 into the recess 148. Thus the next cycle will be initiated without delay.

As a final note to the operation of the input feed driving mechanism, the releasable latching means 118, comprised of members 116 and 120, may be adjustably positioned anywhere along the arcuate slot 112 in the driven arm 114 of the bellcrank lever 108. It will be apparent that the further pivot point 154 of member 116 is positioned toward the end 115 of the driven arm 114, the greater will be the rotation of bellcrank lever 108 and hence the further pusher 50 will eventually travel toward its outward position, the in position always remaining the same. Thus, with relatively simple adjustment, the input feed mechanism may be utilized with books of various widths.

STOP MECHANISM

In order to locate accurately the final resting position of the incoming book 26 relative to the worktable 16, there is provided a stop mechanism 156 shown in FIGURE 11. The stop mechanism 156 includes a back stop 158 which is longitudinally adjustable on a generally rectangular plate 159 which in turn is hinged on transport clamp supporting bracket 182 (to be further described) by means of links 164 and 166. Plate 159 and back stop 158 are movable from their solid line position in FIGURE 11, in which position the back stop 158 positions the incoming book 26, to an up, noninterfering position shown dotted in FIGURE 11, whereby the book can be withdrawn from the rear of the table 16. To accomplish such movement there is provided a lever 160 pinned to transport clamp support bracket 182 at 165 and normally biased by compression spring 166 to rotate in the counterclockwise direction relative to FIGURE 11. One end 168 of lever 160 is secured to link 164 by a member 170 while the other end 172 of lever 160 carries a cam following roller 174. Roller 174 is prevented from rotating counterclockwise about pivot point 165 by one surface 176 of fixed cam 178 whenever the transport clamp support bracket 182 and clamp 18 carried thereby occupy the solid line position shown in FIGURE 2 and FIGURE 11. On the other hand, as will be explained, when the table 16, bracket 182, and clamp 18 carried thereby are moved to their second, rearward position, shown dotted in FIGURE 2; the roller 174 is no longer blocked by upper surface 176 of fixed cam 178, and the roller 174, lever 160, member 170, plate 159, and back stop 158 may rotate counterclockwise to their up position.

In operation, with the table 16, clamp 18 and bracket 182 in their first position, lever 160 is prevented from rotating and the back stop 158 accurately positions the incoming book. Once the main transport clamp 18 bottoms and the front knife assembly 20 cuts the trailing edge 78 of book 26, the table 16, clamp 18 and bracket 182 move to their second, rearward position, thus freeing roller 172 and allowing back stop 158 to rotate to its up or noninterfering position; whereby, as will be further described, after the side edges of the book are trimmed, the delivery mechanism 24 may extract the book from the rear of the table.

MAIN TRANSPORT CLAMP

Referring more specifically to FIGURES 8, 9 and 10, there is shown in a somewhat schematic form the main transport clamp 18 and the mechanism utilized for the operation thereof. The clamp 18 is guided for vertical reciprocal motion within a passageway 180 provided in the bracket 182 secured to and movable with the table 16. As can be most clearly seen in the end view of FIGURE 9, the bracket 182 is bifurcated so as to provide an opening 184 therethrough. Such opening permits the book 26 to be withdrawn from the cutting area of the machine after all cutting operations have been performed, in a manner to be further described.

The driving mechanism for moving the transport clamp 18 between its releasing, up position and its clamping, down position includes the cam 128 and cam follower 186, one end of which carries the roller 188 and the other end of which is pivoted at point 190. For purposes of immediate discussion the pivot point 190 will be considered stationary with the cam follower 186 being rotated thereabout in response to rotation of the cam 128. Further discussion will reveal that pivot point 190 is actually movable in a manner which will compensate for the different thicknesses of books being trimmed by the instant invention while at the same time permit the pressure exerted by clamp 18 to be selectively adjusted.

Assuming for the moment that the pivot point 190 is fixed, the transport clamp driving mechanism further includes a bifurcated pull bar 192, a cross-bar 193 which passes under cam follower 186 and is pulled down thereby in response to rotation thereof in a clockwise direction with respect to FIGURE 8. The pull bar 192 includes another crossbar 195 which terminates in a clevis 194 which is pinned to a clamp operating lever 196 pivoted at one end 198 thereof and secured to the transport clamp 18 at the other end by a roller 200 which resides in a slot 204 of the clamp. In operation rotation of cam 128 rotates cam follower 186 which thereby pulls down pull bar 192 to rotate clamp operating lever 196 to move main clamp 18 downward to bottom on book 26. The transport clamp driving mechanism is further provided with return spring 202 which causes pull bar 192, clevis 194, clamp operating lever 196 and clamp 18 to be returned to their initial position once roller 188 has passed its point of maximum displacement under the influence of cam 128.

Since transport clamp 18 is guided within the bracket 182, which as previously noted moves with table 16, it becomes imperative that the linkage between clamp operating lever 196 and the clamp 18 permit relative longitudinal motion between such members. To this end the upper portion of main transport clamp 18 is provided with the slot 204 within which the roller 200 of clamp operating lever 196 will be guided regardless of whether clamp 18 is occupying the solid line position shown in FIGURES 2 and 8 or has been moved to its second dotted line position illustrated as 18' in FIGURE 2.

Since the instant invention must be able to accommodate books of varying thicknesses there is provided means by which the cam 128 may continue to rotate even after the clamp 18 lowers on the book 26. Thus in the case where a relatively thick book has been inserted under the clamp and only a small amount of revolution of cam 128 is necessary to bottom the clamp 18 on the surface of such book; if some take up were not provided, it would be possible that parts of the linkage mechanism including follower 186, pull rod 192 and operating lever 196 would be damaged by the high tensile forces developed. For this reason there is provided an air cylinder 206 within which a piston rod 208 may be inserted. The aforementioned pivot point 190 is at the end of the piston rod 208 such that if the clamp 18 bottoms on books 26 before the cam 128 has rotated roller 188 to its point of maximum displacement, the piston rod 208 may be cushioningly received within the cylinder 206 with the point 210, the intersection between the pull bar 192 and cam follower 186, now becoming the fulcrum point for the cam follower 186. In order to avoid an excessive build-up of pressure within air cylinder 206 there is a restricted connection 212 between the top of the air cylinder 206 and an air tank 214 which may have a greater volume of air than cylinder 206.

Thus the arrangement of the movable pivot point 190 and air cylinder 206 associated therewith absorbs the additional motion of operating cam 128 once the clamp 18 has bottomed on the book 26.

Another important function of the pneumatic clamping achieved by the cooperation of air cylinders 206 and 214 and movable pivot point 190 is that the clamping pressure developed by clamp 18 may be independently predetermined and set by simply preselecting the volume of air in the system including cylinders 206, 214 and the restricting connection 212 therebetween. By using a large cylinder 206 and connecting to it a large volume of air 214, the small amount of motion of piston 208 necessary to make up for the difference in book thickness will not change the preset pressure appreciably, since the total volume of the system will hardly be affected. Thus the relatively resilient preset clamping pressure for the main transport clamp 18, as originally determined by the volume of the system, remains relatively constant despite the thickness of the book being clamped. It should be pointed out that no air is actually being used to push the piston 208, and that the only air being used up will be that due to leakage, which by suitable design, can effectively be reduced to zero.

With the book 26 accurately positioned under the clamp 18 by means of stop mechanism 156, and input feed mechanism 14 (see FIGURE 5a), the mechanism described above operates to effectuate the downward clamping action of transport clamp 18 and the trailing edge 78 of the book 26 may now be trimmed by the front knife assembly 20 in the following manner.

FRONT KNIFE ASSEMBLY

As noted previously and as most clearly seen in FIGURE 6, the front knife assembly includes a generally rectangular frame 62 within which a front knife clamp 96 and front knife blade 98 are operative to secure and cut, respectively, the trailing edge 78 of the book 26 now securely held in position by means of the lowered transport clamp 18. As can be seen in FIGURES 6 and 7 and also in the plan view of FIGURE 1, the frame 62 of front knife assembly 20 includes an upstanding T-shaped (in cross section) fixed clamp 216 upstanding from the horizontally extending lower portion 218 thereof.

The operating mechanism for the front knife clamp 96 is similar to the operating mechanism for the main transport clamp 18 and includes the cam 128 and a roller 224 actuated thereby. The roller 224 is secured to a first end of a cam follower 226 which is pivoted for rotation about the, relatively speaking, fixed end 228 thereof pinned to a piston 230 of air cylinder 232 in such a manner as to cushioningly compensate for the different thicknesses of books which are to be clamped by the front knife clamp 96 in exactly the same manner as described for the operating mechanism of the main transport clamp 18. That is, once the clamp 96 bottoms on the book, the cam follower 226 rotates around the intersection of the cam follower 226 and a pull rod 232 in order to permit the cam 128 to complete its normal cycle of rotation.

As was the case for the main transport clamp, the pressure developed by front knife clamp 96 may be independently predetermined and set for the most efficient cutting by preselecting the volume of the system including air cylinders 230, 231 and restriction 233 therebetween. The small amount of motion of piston 229 in compensating for the thickness of book 26 does not appreciably affect the volume of the system, and hence the original pressure set for clamp 96 remains relatively constant despite different thicknesses of books.

Secured to cam follower 226 and operated thereby is a bifurcated pull rod 232 which passes through the lower longitudinal member 218 of frame 62 and is secured to opposite sides of the front knife clamp 96. Return springs 234 are provided to raise the front knife clamp 96 automatically after the blade 98 has trimmed the trailing edge 78 of book 26.

Front knife blade 98 is pivoted on links 234 and 238 such that in response to rotation of cam 128 the pull rod 240 pulls the blade 98 (see FIGURES 5b and 5c) down to trim the trailing edge 78 of book 26, the rear portion of which is now firmly held between the T-shaped lower clamp 216 and the front knife clamp 96 to assure a clean cut. As is conventional in guillotine cutting, the movement of blade 98 is both vertical and transverse to assure the proper shearing angle.

Upon continued rotation of cam 128 return spring 234 raise the front knife clamp 96, and immediately thereafter rod 240 raises the front knife blade 98 to its original position to complete the first cutting operation. As soon as clamp 96 releases, the table, book, and main transport clamp 18 may be moved rearwardly to accomplish the cutting of the edges of the book transverse to trailing edge 78 in the following manner. Time is conserved by not waiting for the knife blade 98 to move up.

MOVABLE WORKTABLE

As noted previously and as may be seen in FIGURE 8, the table 16 is movable between its first position, in which the book 26 was originally deposited by the input feed mechanism and then cut by the front knife assembly, and a second position in which the side edges of the book transverse to that edge cut by the front knife assembly may be trimmed by the two side knife assemblies 22. To accomplish such movement there is provided a cam 242 upon which rides the rollers 244 and 246. Rollers 244 and 246 are carried by lever arms 248 and 250 of the cam follower 252 which is linked to a member 254 which in turn is pivotally secured to the bracket 182 of table 16.

Immediately after the trimming of trailing edge 78 of book 26 by the front knife assembly 20, cam 242 is rotated to rotate roller 244, lever arm 250 and link 254 in a clockwise direction to move the table 16 and bracket 182 thereof, along with the book 26, to the dotted line position indicated as 18' in FIGURE 2. After the side cuts have been performed by the side knife assemblies 22, in a manner to be described, continual rotation of cam 242 rotates the roller 246 and cam follower 252 in a counterclockwise direction to return the table 16 and the by now raised transport clamp 18 to its original position. During such movement the delivery mechanism to be described, is operative to extract the book 26 from the cutting area of the machine and onto the conveyor belt 30, shown in FIGURE 2. By the time the table 16 and clamp 18 reach their initial position, the trimmed book has been completely extracted, the back stop 158 has been automatically lowered, as previously described, and the table awaits the reception of the next book being simultaneously fed across the bridge 68 and through the frame 62 of the front knife assembly 20 by the input pusher 50.

As can be seen in FIGURE 9, the table is generally a rectangular member having a slot extending along the upper surface 316 thereof.

SIDE KNIFE ASSEMBLIES

As noted previously, after the front knife assembly 20 has trimmed the trailing edge 78 of book 26, the front knife clamp 96 and front knife blade 98 are raised whereby the book 26 may be moved rearwardly with the table 16 and main transport clamp 18 toward their second position in which the transverse edges 272 thereof are completely cleared from possible interference with the front knife assembly 20. When under the influence of cam 242, cam follower 252, and link 254; the table 16 completes its movement to the position illustrated as 18' in FIGURE 2, the transverse edges 272 of the book are automatically positioned between lower clamping surface 256 and a side knife clamp 258 on the side knife assemblies 22 positioned on opposite sides of the table 16.

Each side knife clamp 258 (FIGURE 12) is independently movable down to clamp the respective edge 272 of the book 26 after the table 16 has completed its rearward motion, in response to rotation of a cam 260 which rotates cam follower 262 in a counterclockwise direction about, relatively speaking, fixed pivot point 264 to pull the pull rod 266 downward which thereby rotates side clamp operating lever 268 about its pivot 270 to lower the clamp 258. The lowered side clamp 258, together with the lower surface 256, firmly grasp the surface of the book immediately adjacent the side edge 272 which is to be trimmed by the side knife assemblies 22.

The end 264 of the cam follower 262 is pivoted on a piston rod 278 cushioningly movable within an air cylinder 280 so as to permit the fixed pivot point of the cam follower 262 to rotate in a clockwise direction in the event that the side knife clamp 258 bottoms on the book 26 before the cam 260 has completed half a revolution. Thus, and as was the case for the main transport clamp 18 and front knife clamp 96, the side knife assemblies are inherently capable of accepting books of varied thickness, while at the same time the pressure developed by the clamps 258 may be independently predetermined by preselecting the volume of the system including air cylinders 280, 281 and the restriction 283 therebetween.

Immediately after the bottoming of side clamp 258, the side knife blades 273, pivoted on links 274, are pulled down by actuating rod 276 to trim the side edges 272 off the book 26. As in the case of the front knife blade 98, the links 274 are arranged such that the side knife blade 273 will experience a downward and transverse motion to assure proper shear angle.

It should be noted that the side knife assemblies 22 are laterally movable on bars 282 to permit the acceptance of books of different widths.

Following the trimming of side edges 272 by the side knife blades 273, the side knife clamps 258 and the blades 273 are raised; the clamp 258 under the influence of return spring 267, and the blades 273 under direct influence of rod 276.

Simultaneously, the main transport clamp 18 is raised under the influence of return spring 202 (see FIGURE 8) and the table 16 is returned toward its initial position under the influence of cam 242, roller 244 and cam follower 252.

While the table 16 is being returned to its initial position, the delivery mechanism positions itself to accomplish extraction of the book from the table in the following manner.

DELIVERY MECHANISM

Referring to FIGURES 1 and 13, the delivery mechanism is seen to include a trolley 282 carried by rollers 284 and 286 guided for movement within tracks 288 located beneath the conveyor belts 30.

Pivotally mounted at 290 on a forwardly extending portion of the trolley 282 is a paddle carrying lever 292 having a paddle 222 secured at one end thereof and a roller 296 secured on the opposite end thereof. Pivotally mounted on the paddle carrying lever 292 at 298 thereof is a generally L-shaped member 300 upon which is laterally adjustably positioned an L-shaped retaining bracket 302. The L-shaped link 300 has pivotally secured thereto at end 304 thereof substantially J-shaped member 306, one end 308 of which is pivoted at 310 to a rigidly upstanding portion 312 of the trolley 282.

Assuming the paddle-carrying lever 292 is positioned in the internal cavity 314 of the worktable 16 with the paddle 222 upstanding above the upper surface 316 thereof, and with a book 26 positioned between the paddle 222 and the L-shaped retaining member 302, the delivery drive mechanism 318 functions to deliver the book 26 to the conveyor belts 30 in the following manner.

Rotation of cam 242 rotates roller 318 to rotate arm 320 about fixed pivot point 322 in a clockwise direction. Pinned to the opposite end 324 of arm 320 is a rod 326, the opposite end of which is secured to the bellcrank lever 328 which rotates in the direction of arrow 330 in response to clockwise rotation of cam 242. Bellcrank lever 328 is pivotally secured to a linking arm 332 which in turn is secured to a depending bracket 334 of the trolley 282. Thus clockwise rotation of cam 242 moves the trolley 282 toward the dotted line position shown at the right of FIGURE 13 along the tracks 288.

While the paddle 222 is dragging the book 26 across the upper surface 316 of the table 16 onto the conveyor belts 30 which are driven by the roller 336 and pulley 338, the rear L-shaped retaining member 302 secured to L-shaped link 300 prevents any sudden jerk of the paddle 222 from throwing the book 26.

During the entire movement thus far described, the paddle-carrying arm 292 is maintained in its up position by means of a latch 340 pivotally biased by a spring, not shown, to its up position on trolley 282. The pointed tip 342 of latch 340 engages an axle 346 upon which the roller 296 is mounted, thereby preventing the paddle-carrying arm 292 from rotating counterclockwise about the pivot point 290 to its down position.

However, as the trolley 282 is moved toward the right in FIGURE 13 under the influence of cam 242, arm 320, member 326, bellcrank 328 and link 332, the latch 340 engages a runner 348 to rotate the latch clockwise about its own axis. Thus the latch tip 342 is freed from the axle 346 and the natural weight of the paddle-carrying arm 292 and L-shaped member 300 causes such members to fall beneath the upper surface of the conveyor belts 30 so that the book deposited thereon can continue its rearward movement.

On the return trip of trolley 282, the roller 296 provided on the end of paddle-carrying member arm 292 hits roller 350 thereby causing the paddle-carrying arm 292 to be rotated clockwise about pivot 290 until the latch tip 342 once more engages the axle 346. Thus the paddle-carrying arm 292 and L-shaped member 300, and the paddles 294 and 302, respectively, carried thereby are raised once more into their starting position in which they can grasp the next book which during the period of return travel of trolley 282 has been completely trimmed in accordance with the steps outlined above.

SYNCHRONIZED DRIVE SYSTEM

Referring to FIGURE 14, there is shown one possible drive system which might be utilized in the instant invention. There is provided a single motor 352 upon the shaft 354 of which the pulley 356 is secured to rotate the flywheel 358 in response to energization of the motor 352. A clutch brake 360 is provided to engage the main shaft 362 with the rotating flywheel 358, in a well known manner. Assuming the three-knife trimmer of the instant invention is to be operated at the rate of 100 cycles per minute, the main shaft 362 is arranged to rotate at a speed of 1,500 r.p.m., and a reduction box 364 is provided with an input-output ratio of 15–1 to produce rotation of shaft 366 at the rate of 100 r.p.m. Front and rear cam shafts 368 and 370 are similarly rotated at the rate of 100 r.p.m. by means of the right angle gearing mechanisms 372 and 374, respectively. A reduction box 376 is provided on main shaft 362 with a step-down ratio of 1:2 so that shaft 378 rotates at 750 r.p.m and reduction boxes 380 are further provided on shaft 378 with a step-down ratio of 7.5:1 such that the cams 260 which operate the side knife clamps 258 and side knife blades 273 of FIGURE 12 will rotate at 100 r.p.m.

Cam shaft 368 carries the cam 128, which as explained previously, operates the input feed mechanism of FIGURE 5, the front knife assembly 20 shown in FIGURES 6 and 7, and the main transport clamp 18 as shown in FIGURE 8. Also, although not shown, cam shaft 368 might be utilized to operate the conveyor belt 46 and stacking mechanism 12, shown in detail in FIGURES 3 and 4.

Cam shaft 370 carries the cam 242 which, as noted previously, controls the movement of the table 16 between its first and second position, see FIGURE 8, and also controls the operation of the delivery mechanism shown in detail in FIGURE 13.

It now becomes apparent that all subassemblies of the instant invention are operated at cycle speed, in this case chosen as 100 r.p.m., capable therefore of trimming books at the rate of 100 units per minute. Furthermore, since all subassemblies are operated by cams controlled by the single power source all subassemblies will be inherently synchronized with respect to each other.

To complete the description and to facilitate understanding of the instant invention, a complete cycle of operation will now be described. A book or books 26 is initially deposited on the work surface 28, by the projecting fingers 44 of the endless belts 42 of the stacking mechanism 12. Immediately thereafter the pusher 50 of the input feed mechanism 14 passes through the containing enclosure 32 of the stacking mechanism 12 and pushes the book across the bridge 68, now in its up position, through the front knife assembly 20 and onto the table 16. The back stop 158 of the stop mechanism 156, shown in FIGURE 11, stops the leading edge of the book to accurately position the book such that the trailing edge 78 thereof overhangs the T-shaped lower clamp 216 of the front knife assembly 20.

The main transport clamp 18 begins its downward movement followed almost immediately by the front knife clamp 96 and front knife blade 98 to begin the trimming operation of the trailing edge 78, it being noted that when the front knife clamp 96 bottoms on the upper surface of the book the trailing edge 78 of the book will be accurately and firmly held in position to facilitate the trimming thereof by blade 98.

Simultaneously with the descent of the main transport clamp 18, the bridge 68 is moved to its down position 68' in FIGURE 5b to permit non-interfering operation of the front knife clamp and blade, while at the same time the switch 90 beneath the work surface 28 is moved to its up position such that the front wheel 56 of the trolley 52 is urged into the lower track 94. Thus the pusher 50 is dropped beneath the surface of the work table 28 such that the next book 26 may be deposited on the surface 28 by the stacking mechanism 12, even while the pusher 50 is being returned to its initial position.

Returning to the initial book 26, whose rear edge 78 is being trimmed by the front blade 98; upon completion of such operation the front knife clamp 96 and front knife blade 98 are raised while at the same time the table 16 and transport clamp 18 carried by the bracket 182 of table 16 are moved to their second position in which the side edges of the book are free of the front knife assembly 20 and captured between the lower surfaces 256 and the side knife clamps 258 of the side knife assemblies 22. As the transport clamp moves to the second position, the back stop 158 is raised above the book.

Just as the motion of the table 16 comes to a halt, the side knife clamps 258, followed by the side knife blades 273 comes down to trim the side edges 272 of the book 26.

As the side knife blade and side knife clamp are returning to their initial up position the delivery mechanism of FIGURE 13 is operating such that the paddle-carrying arm 292 is being inserted through the cavity 314 of table 16. When the paddle 294 has come out the front end of the table 16, it, and the L-shaped member 302 are raised above the surface of the table on opposite sides of the book 26.

Simultaneously with the upward movement of the side knife clamp and blades, the main transport clamp 18 is raised and the table 16 begins its movement toward its first position under the influence of cam follower 252.

Travelling in the opposite direction, however, is the trolley 282 of the delivery mechanism such that the book is moved in a direction opposite to the movement of the table and onto the conveyor belt 30 whereby the book may be fed to the next step of manufacture.

It will be appreciated that the pressure developed by all four clamps utilized in the trimmer (i.e., transport, front and two side clamps) may be independently chosen for the particular function performed by simply pre-selecting the volume of their respective pneumatic systems.

Thus there has been described a continuous three-knife trimmer comprising a plurality of synchronized subassemblies operating at a cycle speed and capable of automatically and accurately trimming up to three edges of a book at extremely high rates of speed.

Although there has been described a preferred embodiment of this novel invention, many variations and modifications will now be apparent to those skilled in the art. Therefore, this invention is to be limited, not by the specific dsclosure herein, but only by the appending claims.

What is claimed is:

1. In combination:
   a work surface upon which a quantity of material which is to be moved to a second position may be deposited at a first position;
   transport means movable on said work surface from a starting position to a finishing position for moving said material from said first to said second position;
   transport driving means for moving said transport means between its starting and finishing position at a predetermined rate of speed;
   a material receiving table reciprocal between a first position which is a predetermined distance from said work surface to establish a predetermned space therebetween and a second position which is further from said work surface than said first position of said work table, said first position of said table corresponding to the second position of said material;
   a front knife assembly positioned above said predetermined space for cutting a first edge of said material when said material is moved to its second position on said table in its first position by said transport means;
   a side knife assembly positioned a predetermined distance from said front knife assembly for cutting a second edge of said material which is transverse to said first edge when said table is in its second position; and
   table operating means for moving said table at said predetermined rate of speed from its first to its second position after said front knife assembly has cut said first edge.

2. The combination of claim 1 and further including transportable clamp means positioned above said table and movable therewith when said table moves between its first and second position, said transportable clamp means being movable between a releasing position and a clamping position in which said transportable clamp means clamps said material against said table; and transportable clamp driving means for moving said transportable clamp between its releasing and clamping position after said transport means has moved said material to its second position on said table in its first position, said transportable clamp driving means, said transport driving means and said front knife assembly all being driven at said predetermined speed by a single power source.

3. The combination of claim 2, wherein said work surface further includes bridge means pivotally mounted on one end thereof, said bridge means being movable in response to movement of said transportable clamp means from its releasing to its clamping position, from a first position parallel to said work surface in which said bridge means bridges said predetermined space to permit said material to be moved from its first position on said work surface to its second position on said table, to a second position transverse to said work surface whereby said front knife assembly can operate without interferring with said bridge means.

4. The combination of claim 1 and further including:
guide means cooperating with said transport means for returning said transport means from its finishing to its starting position in a path of movement which lies beneath said work surface at least until said transport means passes said first position of said material, whereby another quantity of material may be non-interferingly deposited on said work surface before said transport means passes said first position of said material on its return to its starting position; and
a containing enclosure positioned above said first position of said material and including a first pair of side walls, each of which includes stacking means which cooperate to deposit said material on said work surface, and a second pair of side walls transversely oriented with respect to said first pair of walls and with respect to said work surface, said second pair being spaced a predetermined distance from said work surface to permit said transport means to pass through said enclosure as it moves from its starting to its finishing position.

5. The combination of claim 2 and further including:
guide means cooperating with said transport means for returning said transport means from its finishing to its starting position in a path of movement which lies beneath said work surface at least until said transport means passes said first position of said material, whereby another quantity of material may be non-interferingly deposited on said work surface before said transport means passes said first position of said material on its return to its starting position, said guide mean comprising;
a first track for guiding said transport means above said work surface as it moves from its starting to its finishing position,
a second track spaced beneath said first track for guiding said transport means beneath said work surface as it moves from its finishing position back towards its starting position, and
switch means normally positioned in a first position for permitting said transport means to be guided by said first track as it moves from its starting to its finishing position, and movable to a second position for permitting said transport means to be guided by said second track as it moves from its finishing position back towards its starting position; and
bridge means pivotally mounted on one end of said work surface, said bridge means being movable from a first position parallel to said work surface in which said bridge means bridges said predetermined space to permit said material to be moved from its first position on said work surface to its second position on said table, to a second position transverse to said work surface whereby said front knife assembly can operate without interfering with said bridge means; said bridge means being moved to its second position, and said switch means being moved to its second position in response to movement of said transportable clamp means between its releasing and clamping position after said material has been moved by said transport means from its first position on said work surface to its second position on said table in its first position.

6. The combination of claim 1 wherein said material receiving table includes a longitudinal slot extending along an upper surface thereof, and a substantially hollow interior communicating with said slot; and further including:
delivery transport means movable above said upper surface from a starting to a finishing position for moving said material from a first position on said table when said table is in its second position to a second position off said table; and
delivery operating means cooperating with said delivery transport means and operating at said predetermined rate of speed for returning said delivery transport means from its finishing to its starting position in a path of movement which passes through said hollow interior, out an end thereof and up to its starting position above said upper surface.

7. The combination of claim 6, wherein said transport driving means; said table operating means; said front knife assembly; said side knife assembly; and said delivery operating means are all operated at a predetermined rate of speed by a single power source.

8. The combination of claim 4, wherein said material receiving table includes a longitudinal slot extending along an upper surface thereof, and a substantially hollow interior communicating with said slot; and further including:
delivery transport means movable above said upper surface from a starting to a finishing position for moving said material from a first position on said table when said table is in its second position to a second position off said table; and
delivery operating means cooperating with said delivery transport means and operating at said predetermined rate of speed for returning said delivery transport means from its finishing to its starting position in a path of movement which passes through said hollow interior, out an end thereof and up to its starting position above said upper surface.

9. A high-speed three knife trimmer for trimming material comprising:
a material receiving table reciprocal between a first and second position;
a front knife assembly for cutting a first edge of said material when said table is in its first position;
a side knife assembly positioned a predetermined distance from said front knife assembly for cutting a second edge of said material which is transverse to said first edge when said table is in its second position; and
table operating means for moving said table from its first to its second position after said front knife assembly has cut said first edge.

10. The three knife trimmer of claim 9, and further including transportable clamp means positioned above said table and movable therewith when said table moves between its first and second position, said transportable clamp means being automatically movable between a releasing position and a clamping position in which said transportable clamp means clamps said material against said table.

11. The three knife trimmer of clim 10, and further including transportable clamp driving means for driving said transportable clamp means between its releasing and clamping position, said transportable clamp driving means including:
first cam means rotatable in a first direction and being driven by a power source which also drives said operating means;

a first cam following operating lever pivotally fixed at one end thereof and being urged in a first direction at its other end thereof by said first cam means in response to rotation thereof in its first direction; and a first pull bar linked at one end thereof to said first cam following operating lever and at the other end thereof to said transportable clamp means;

whereby rotation of said first cam means in its first direction causes said first cam following operating lever to be rotated in its first direction to cause said first pull bar to be moved down to thereby urge said transportable clamp means between its releasing and clamping positions.

12. The three knife trimmer of claim 11, wherein said driving means further includes a clamp operating lever pivotally fixed at one end thereof, a second end of said clamp operating lever being connected to said transportable clamp to permit relative motion therebetween in a path of movement which corresponds to the path of movement of said table from its first to its second position, but to prevent relative motion therebetween in a path of movement which corresponds to the path of movement of said transportabel clamp means from its releasing to its clamping position; said pull bar being connected to said clamp operating lever at its other end thereof to transmit motion of said cam following operating lever to said transportable clamp means.

13. The three knife trimmer of claim 11, wherein said driving means further includes an air cylinder having a predetermined volume of air, and a piston rod having a portion thereof movable into said cylinder to compress said air after a predetermined amount of force has been applied to said piston rod; said one end of said cam following operating lever being pivotally connected to said piston rod; whereby after said transportable clamping means bottoms on said material during its movement from its releasing to its clamping position, said rotating cam means causes said cam folowing operating lever to be rotated around said pull bar whereby said one end of said cam following operating lever urges said piston rod into said air cylinder.

14. The three-knife trimmer of claim 13, wherein said predetermined volume of air is independently chosen in accordance with the clamping pressure desired for said transportable clamp, and wherein the movement of said piston rod into said air cylinder has relatively little affect on the magnitude of said predetermined volume of air; whereby said clamping pressure desired for said transportable clamp is maintained relatively constant.

15. The three-knife trimmer of claim 10 and further including stop means for positioning an edge of said material which is opposite said first edge relative to said table when material is fed onto said table, said stop means being automatically movable from a first blocking position to a second nonblocking position in which said stop means is lifted above its first position when said table is moved between its first and second position, movement of said stop means to its nonblocking position permitting said material to be freely extracted from the rear of said table.

16. The high-speed knife trimmer of claim 10, wherein said front knife assembly includes:

a front knife clamping assembly for clamping said first edge prior to the cutting thereof; and a front knife blade assembly for cutting said first edge after said front knife clamping assembly clamps said first edge, said front knife clamping assembly and said front knife blade assembly being operated a short time after said transportable clamp means begins its travel from its releasing to its clamping position, said front knife clamping assembly comprising:

a front knife clamp movable between a releasing and clamping position, cam means rotatable in a first direction and being driven by a power source which also drives said table operating means, a cam following operating lever pivotally fixed at one end thereof and being urged in a first direction at its other end thereof by said cam means in response to rotation thereof in its first direction, and a pull bar linked at one end thereof to said cam following operating lever and at the other end thereof to said front knife clamp, whereby rotation of said cam means in its first direction causes said cam following operating lever to be rotated in its first direction to cause said pull bar to be moved down to urge said front knife clamp from its releasing to its clamping position.

17. The high-speed knife trimmer of claim 16, wherein said front knife clamping assembly further includes an air cylinder having a predetermined volume of air, and a piston rod having a portion thereof movable into said cylinder to compress said air after a predetermined amount of force has been applied to said piston rod; said one end of said cam following operating lever being pivotally connected to said piston rod; whereby after said front knife clamp bottoms on said first edge of said material during its movement from its releasing to its clamping position, said rotating cam means causes said cam following operating lever to be rotated around said pull bar whereby said one end of said cam following operating lever urges said piston rod into said air cylinder.

18. The three-knife trimmer of claim 17, wherein said predetermined volume of air is independently chosen in accordance with the clamping pressure desired for said front knife clamp, and wherein the movement of said piston rod into said air cylinder has relatively little affect on the magnitude of said predetermined volume of air; whereby said clamping pressure desired for said front knife clamp is maintained relatively constant.

19. The high-speed knife trimmer of claim 16, wherein said front-knife blade assembly and said front knife clamping assembly are removably mounted on a frame and said front knife blade assembly includes:

a front blade pivotally linked on said frame and movable between a noncutting and cutting position in a path of movement which is both parallel to and transverse to the path of movement of said front knife clamp so as to effect proper cutting of said first edge of said material; and linking means connected between said cam means and said front blade for effecting movement of said front blade in response to rotation of said cam means.

20. The high-speed knife trimmer of claim 16, wherein said side knife assembly includes:

a side knife clamping assembly for clamping said second edge prior to the cutting thereof; and a side knife blade assembly for cutting said second edge after said side knife clamping assembly clamps said second edge;

said side knife clamping assembly and said side knife blade assembly being operated after said table has been moved to its second position by said table operating means;

said side knife clamping assembly comprising:

a side knife clamp movable between a releasing and clamping position, second cam means rotatable in a first direction and being driven by a power source which also drives said table operating means, and said cam means of said front knife clamping assembly, a second cam following operating lever pivotally fixed at one end thereof and being urged in a first direction at its other end thereof by said second cam means in response to rotation thereof in its first direction, and a second pull bar linked at one end thereof to said second cam following operating lever and at the other end thereof to said side knife clamp, whereby rotation of said second cam means in its first direction causes said second cam following operating lever to be rotated in its first direction to cause said second pull bar to be moved down to urge said side knife clamp from its releasing to its clamping position.

21. The high-speed knife trimmer of claim 20, wherein said side knife clamping assembly further includes an air cylinder having a predetermined volume of air, and a piston rod having a portion thereof movable into said cylinder to compress said air after a predetermined amount of force has been applied to said piston rod; said one end of said second cam following operating lever being pivotally connected to said piston rod of said side knife-clamping assembly; whereby after said side knife clamp bottoms on said second edge of said material during its movement from its releasing to its clamping position, said second cam means causes said second cam following operating lever to be rotated around said second pull bar whereby said one end of said second cam following operating lever urges said piston rod into said air cylinder.

22. The three-knife trimmer of claim 21, wherein said predetermined volume of air is independently chosen in accordance with the clamping pressure desired for said side knife clamp, and wherein the movement of said piston rod into said air cylinder has relatively little affect on the magnitude of said predetermined volume of air; whereby said clamping pressure desired for said side knife clamp is maintained relatively constant.

23. The high-speed knife trimmer of claim 20, wherein said side knife blade assembly and said side knife clamping assembly are movably mounted on a frame and said side knife blade assembly includes:
 a side blade pivotally linked to said frame and movable between a non-cutting and cutting position in a path of movement which is both parallel to and transverse to the path of movement of said side knife clamp so as to effect proper cutting of said second edge of said material; and
 linking means connected between said second cam means and said side blade for effecting movement of said side blade in response to rotation of said second cam means.

References Cited

UNITED STATES PATENTS

| | | | |
|---|---|---|---|
| 826,075 | 7/1906 | White | 83—256 |
| 1,076,726 | 10/1913 | Welch | 83—255 |

JAMES M. MEISTER, *Primary Examiner.*

U.S. Cl. X.R.

83—268, 277, 278, 280, 459